(12) United States Patent
Chen

(10) Patent No.: US 8,482,914 B2
(45) Date of Patent: Jul. 9, 2013

(54) ELECTRONIC DEVICE

(75) Inventor: Wen-Cheng Chen, Taipei (TW)

(73) Assignee: Compal Electronics, Inc., Taipei (TW)

( * ) Notice: Subject to any disclaimer, the term of this patent is extended or adjusted under 35 U.S.C. 154(b) by 65 days.

(21) Appl. No.: 13/304,693

(22) Filed: Nov. 28, 2011

(65) Prior Publication Data

US 2013/0139188 A1  May 30, 2013

(51) Int. Cl.
*G06F 1/16* (2006.01)
(52) U.S. Cl.
USPC ............ 361/679.37; 361/679.38; 361/679.39; 361/679.33; 361/679.02; 360/99.06; 360/99.12; 360/99.13
(58) Field of Classification Search
USPC ........................................ 361/679.37–679.39
See application file for complete search history.

(56) References Cited

FOREIGN PATENT DOCUMENTS

| TW | 491502 | 6/2002 |
|----|--------|--------|
| TW | 555037 | 9/2003 |

*Primary Examiner* — Anthony Q Edwards
(74) *Attorney, Agent, or Firm* — Jianq Chyun IP Office

(57) ABSTRACT

An electronic device with multi-phase mechanism including a host, a storage device and a carriage is provided in the present invention. The storage device is slidably disposed in the host and adapted to be pulled out from the host. The carriage is slidably disposed in the storage device and adapted to be pulled out from the storage device. Through the storage device slidably disposing in the host and being adapted to be pulled out from the host, it facilitates the user to take or replace a content from the storage device. When the carriage is moved out from the storage device in a first phase and then the storage device is pulled out from the host in a second phase, the content in the storage device is taken out.

11 Claims, 8 Drawing Sheets

ELECTRONIC DEVICE

BACKGROUND OF THE INVENTION

1. Field of the Invention

The present invention generally relates to electronic devices and more particularly to an electronic device having a multi-phase structure of storage device.

2. Description of Related Art

In this information society, people increasingly depend on electronic products. The electronic products such as all-in-one personal computers (AIO PCs), tablet personal computers (tablet PCs) or laptops are widely used in daily life. In order to achieve purpose of convenience, electronic products have been manufactured in compact size. However, sometimes the excessively compact size products may lead to inconvenience. For example, the all-in-one personal computers which are manufactured a very large display unit together with a very compact host, are rather inconvenient for the end customers when using the optical storage device. FIG. 1A and FIG. 1B illustrate one of the encountering problems for end customers of larger all-in-one computers. Referring to FIG. 1A, an all-in-one computer 10 includes a display unit 14, a host 12 and an optical disc drive (ODD) 16, wherein the display unit 14 is connected to the host 12, and the optical disc drive 16 is disposed in the host 12 and is adapted to accommodate a compact disc (CD) 50. Referring to FIG. 1A and FIG. 1B, the all-in-one computer 20 in FIG. 1B has a larger display unit 24 comparing to that of FIG. 1A. It becomes rather inconvenient for an end customer to take or replace the compact disc 60 from the optical disc drive 26 which is disposed at the host 22. Since if the display unit 24 in FIG. 1B is larger than the display unit 14 in FIG. 1A, the optical disc drive 26 will be obstructed by the display unit 24. However, large display units are essential for most of the end customers for a better view. The present invention is directed to solve the encountering problem described above with a very simple mechanism and low manufacturing cost.

SUMMARY OF THE INVENTION

Accordingly, the present invention is directed to an electronic device which facilitates a user to take or replace a compact disc from an optical disc drive.

The present invention provides an electronic device with multi-phase mechanism including a host, a storage device and a carriage. The storage device is slidably disposed in the host and adapted to be pulled out from the host. The carriage is slidably disposed in the storage device and adapted to be moved out from the storage device. When the carriage is moved out from the storage device in a first phase and then the storage device is pulled out from the host in a second phase, a content in the storage device is taken out.

According to an embodiment of the present invention, the storage device includes a sliding plate and a main body. The sliding plate is slidably disposed in the host. The main body is fixed on the sliding plate, wherein the carriage is slidably disposed in the main body.

According to an embodiment of the present invention, the storage device is slidably disposed in the host along a sliding direction, and the carriage is slidably disposed in the storage device along the sliding direction.

According to an embodiment of the present invention, wherein the host includes a casing, a frame and a fixed plate. The frame is fixed in the casing. The fixed plate is fixed on the frame, wherein the storage device is slidably disposed on the fixed plate.

According to an embodiment of the present invention, the electronic device further includes at least one sliding element fixed at the fixed plate and slidably disposed at the sliding plate, in which the sliding plate slides by means of the sliding element.

According to an embodiment of the present invention, the electronic device further includes at least one elastic element fixed at the fixed plate, in which the sliding plate resists elastic force of the elastic element to move from a first position to a second position and the sliding plate moves from the second position to a third position by means of elastic force of the elastic element.

According to an embodiment of the present invention, the storage device is an optical disc drive.

According to an embodiment of the present invention, the electronic device further includes a display fixed on the host, wherein the content is a compact disc, and the electronic device is an all-in-one computer.

According to an embodiment of the present invention, when the carriage is pulled from the storage device to an end position, the storage device is adapted to be slid in the host 110.

According to an embodiment of the present invention, a force that is used to pull the carriage out of the storage device is smaller than a force that is used to pull the storage device out of the host.

According to an embodiment of the present invention, the carriage is adapted to be rotated or slid relative to the storage device to moved out from the storage device.

In view of the above, according to the embodiments of the present invention, through the storage device slidably disposing in the host and being adapted to be pulled out from the host, it facilitates the user to take or replace a compact disc from an optical disc notwithstanding the all-in-one computer is configured with a larger display.

In order to make the above features and advantages of the present invention comprehensible, embodiments are described in detail below with the accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
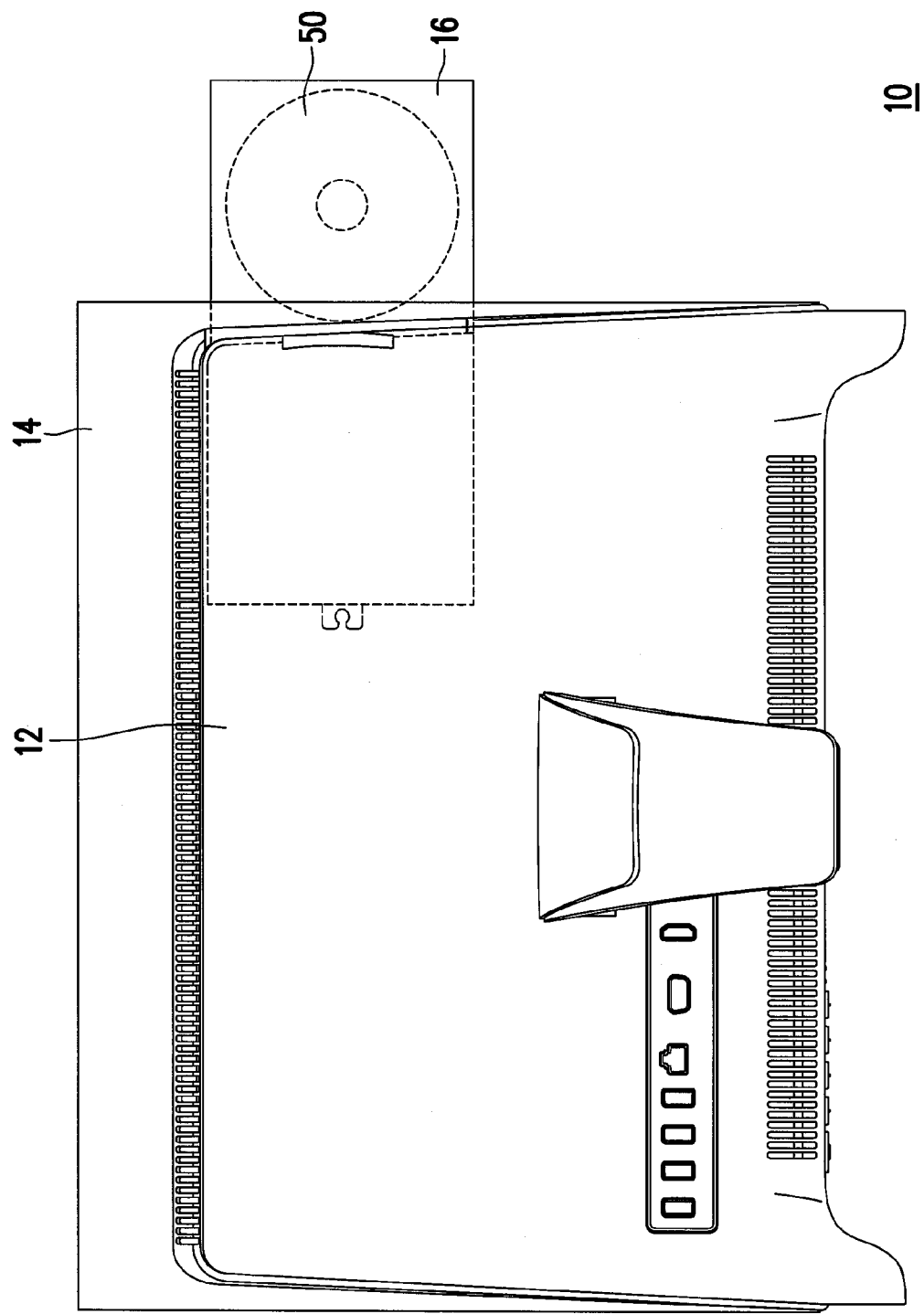
FIG. 1A and FIG. 1B illustrate one of the encountering problems for end customers of larger all-in-one computers.
Figure 1B:
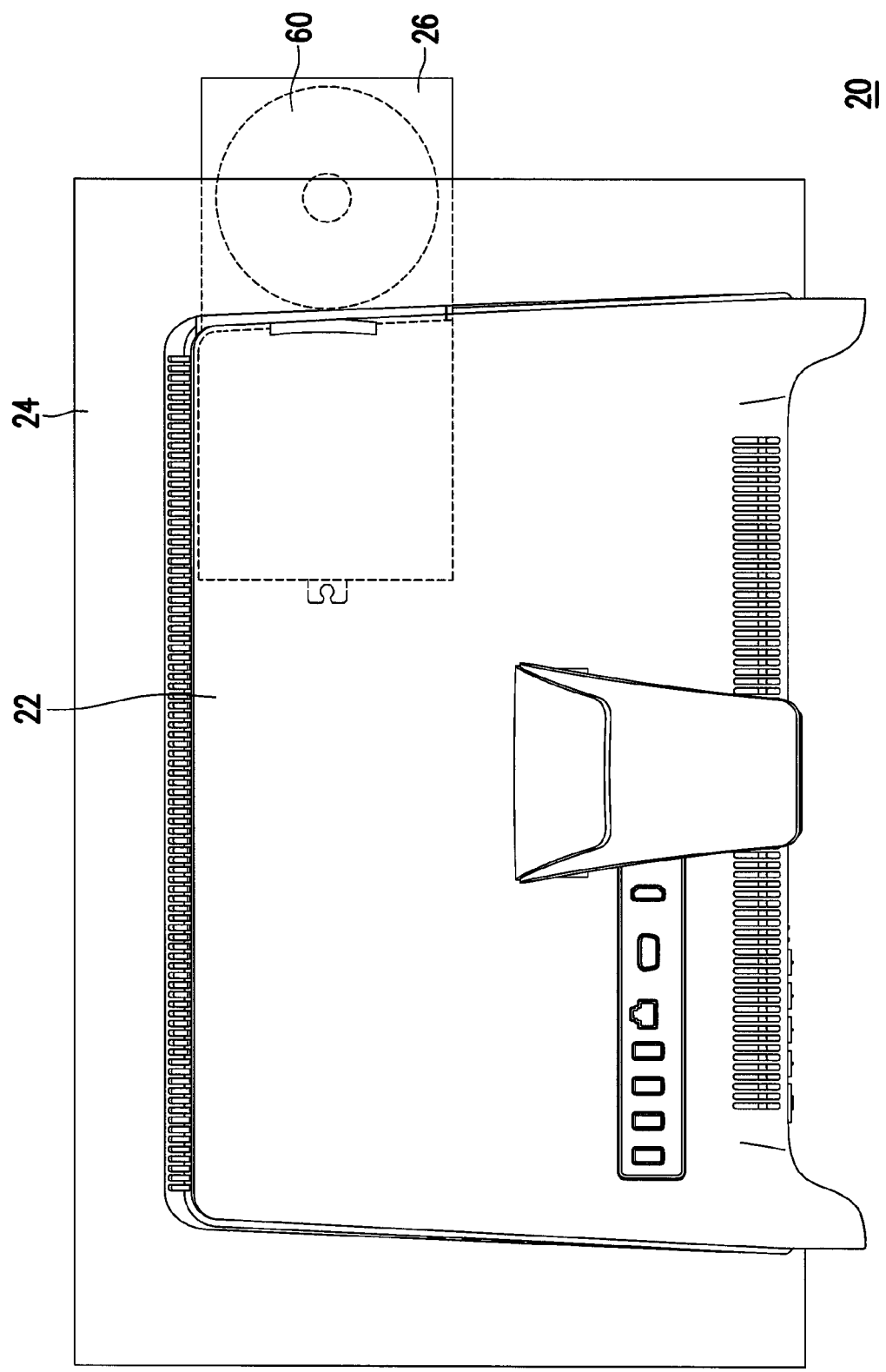

Reference will now be made in detail to the present preferred embodiments of the invention, examples of which are illustrated in the accompanying drawings. Wherever possible, the same reference numbers are used in the drawings and the description to refer to the same or like parts.

The figures are not drawn to scale and they are provided merely to illustrate the present invention. Several aspects of the invention are described below with reference to example applications for illustration. It should be understood that numerous specific details, relationships and methods are set forth to provide a full understanding of the invention. The present invention may be embodied in many different forms and should not be construed as limited to the embodiments set forth herein. For example, the present invention can be embodied as a method or a system.

Figure 2:
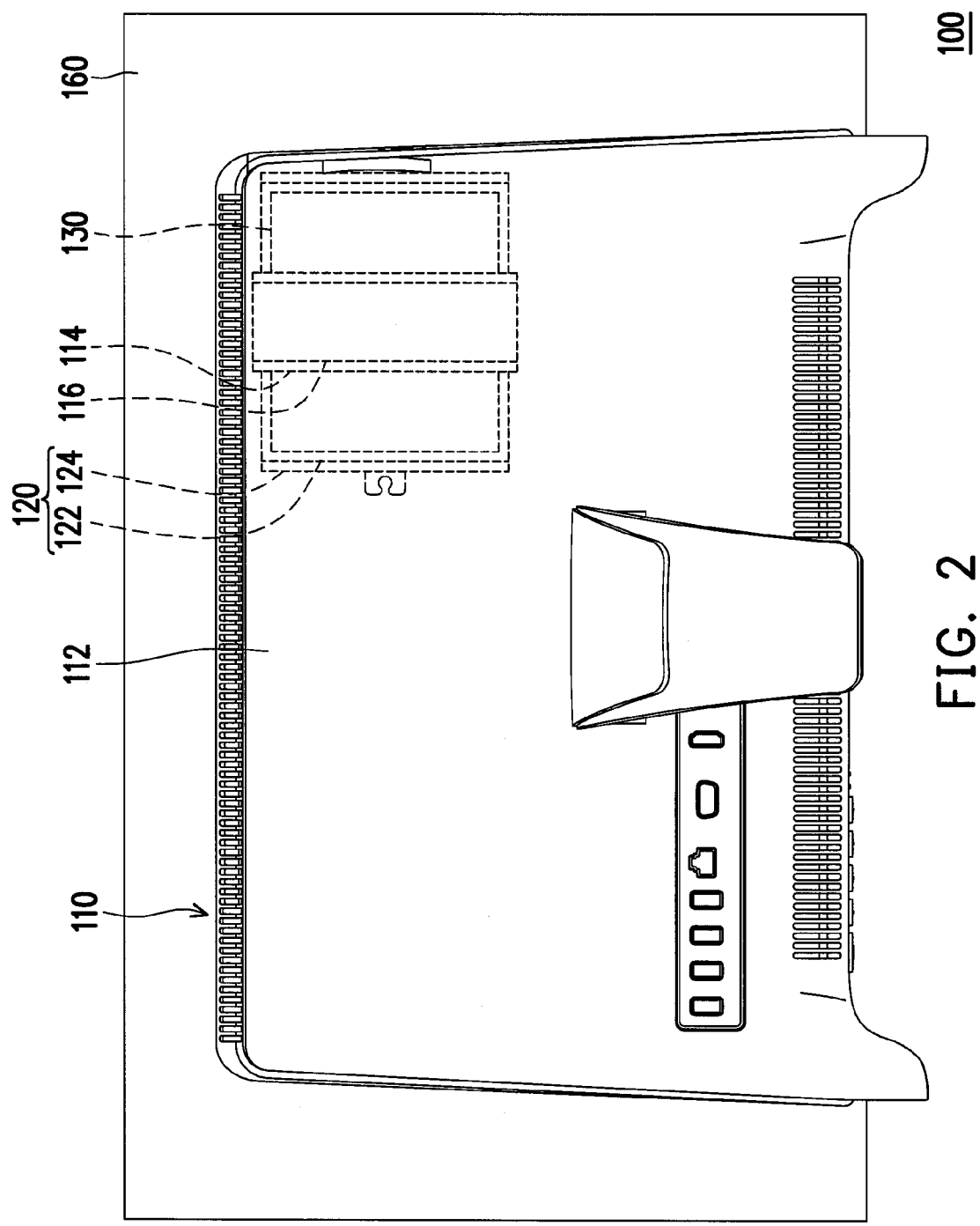
FIG. 2 schematically illustrates an electronic device according to an embodiment of present invention.

The present invention provides an electronic device with a multi-phase mechanism and low manufacturing cost in order to solve the encountering problem in all-in-one personal computers, in which the problem is that the larger display units become the obstructions when a user operates the all-in-one personal computer and takes out the compact disc (CD) that is the content in the storage device from the optical disc drive (ODD). The two phase mechanism is used to be one embodiment of the multi-phase mechanism, but the numbers of the mechanism phase are not limited in the present invention. FIG. 2 schematically illustrates an electronic device according to an embodiment of present invention. Referring to FIG. 2, an electronic device 100 includes a host 110, a storage device 120 and a carriage 130. The storage device 120 is slidably disposed in the host 110 and adapted to be pulled out from the host 110. The carriage 130 is movably disposed in the storage device 120 and adapted to be pulled out from the storage device 120. In the below descriptions, the all-in-one personal computer is used to be one embodiment of the electronic device and the optical disc driver is used to be one embodiment of the storage device, but the sorts of the electronic device and the storage device are not limited in the present invention.

Figure 3:
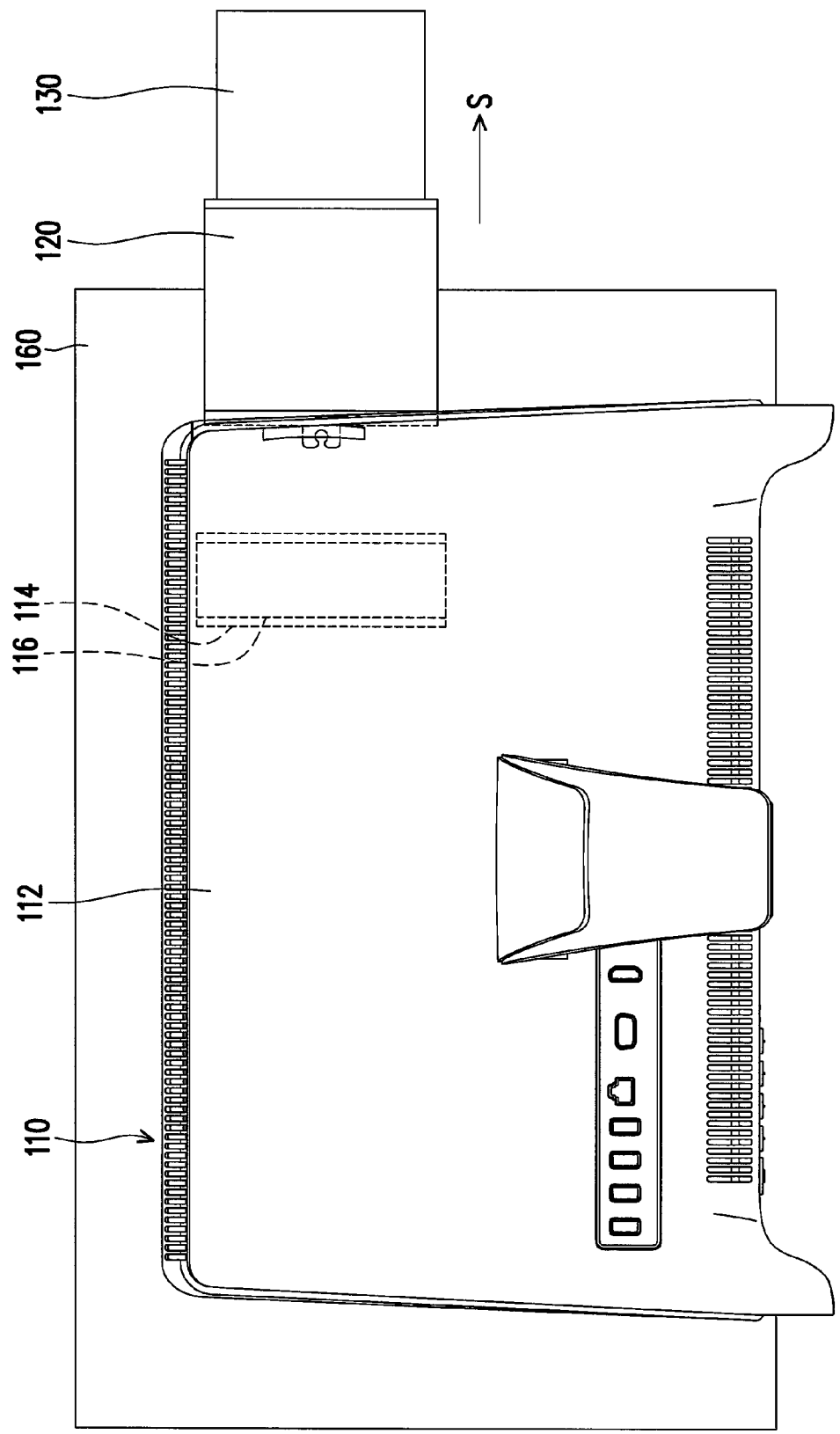
FIG. 3 illustrates the storage device of the electronic device in FIG. 2 is pulled out from the host and the carriage is pulled out from the storage device.

FIG. 3 illustrates the storage device of the electronic device in FIG. 2 is pulled out from the host and the carriage is moved out from the storage device. Referring to FIG. 3, since, the storage device 120 is slidably disposed to be able to pull out a predetermined distance with respect to the host 110, the distance between the storage device 120 and the host 110 is increased. Thus, the electronic device 100 facilitates the compact disc to be conveniently taken or replaced from the carriage 130. Moreover, as shown in FIG. 3, the storage device 120 is slidably disposed in the host 110 along a sliding direction S, and the carriage 130 is slidably disposed in the storage device 120 along the sliding direction S. When the carriage 130 is pulled from the storage device 120 to an end position, the storage device 120 just can be slid in the host 110. Such configuration in this embodiment has the advantage that the compact disc can be easily taken out or replaced from the carriage 130. The slidable carriage 130 is used to be one embodiment of the movable carriage, but the sorts of the movable carriage are not limited in the present invention. The carriage 130 also can rotate relative to the storage device 120 to be moved out of the storage device 120 (not shown in figures).

In the embodiment, the electronic device 100 is an all-in-one computer and further includes a display 160 fixed on the host 110. The storage device 120 can be any sort of optical storage device, for example, an optical disc device. In the embodiment, the carriage 130 is to carry the compact disc.

Figure 4:
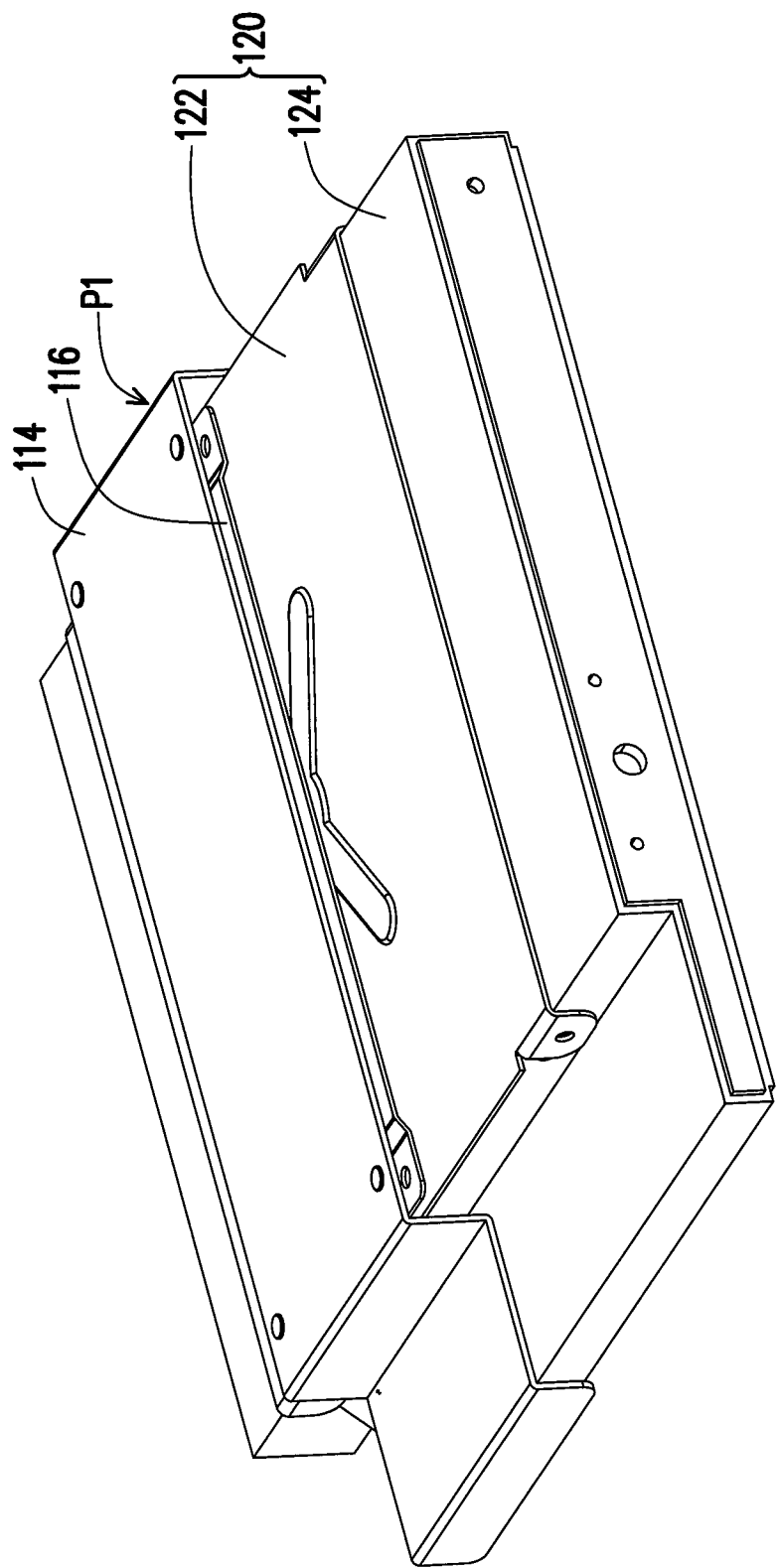
FIG. 4 schematically illustrates the storage device of the electronic device in FIG. 2.

FIG. 4 schematically illustrates the storage device of the electronic device in FIG. 2. Referring to FIG. 2 and FIG. 4, in the embodiment, the storage device 120 includes a sliding plate 122 and a main body 124. The sliding plate 122 is slidably disposed in the host 110. The main body 124 is fixed on the sliding plate 122, wherein the carriage 130 is slidably disposed in the main body 124. The main body 124 is fixed on the sliding plate 122 by means of screws in this embodiment, but the way of fixing the main body 124 to the sliding plate 122 is not limited thereto.

Referring to FIG. 2 and FIG. 4, in the embodiment, the host 110 includes a casing 112, a frame 114 and a fixed plate 116. The frame 114 is fixed in the casing 112 by means of screws in this embodiment. In other embodiments, the frame 114 can be integrally formed with the casing 112. In other words, the frame 114 can be a part of the casing 112. The fixed plate 116 is fixed on the frame 114, wherein the storage device 120 is slidably disposed on the fixed plate 116.

Figure 5:
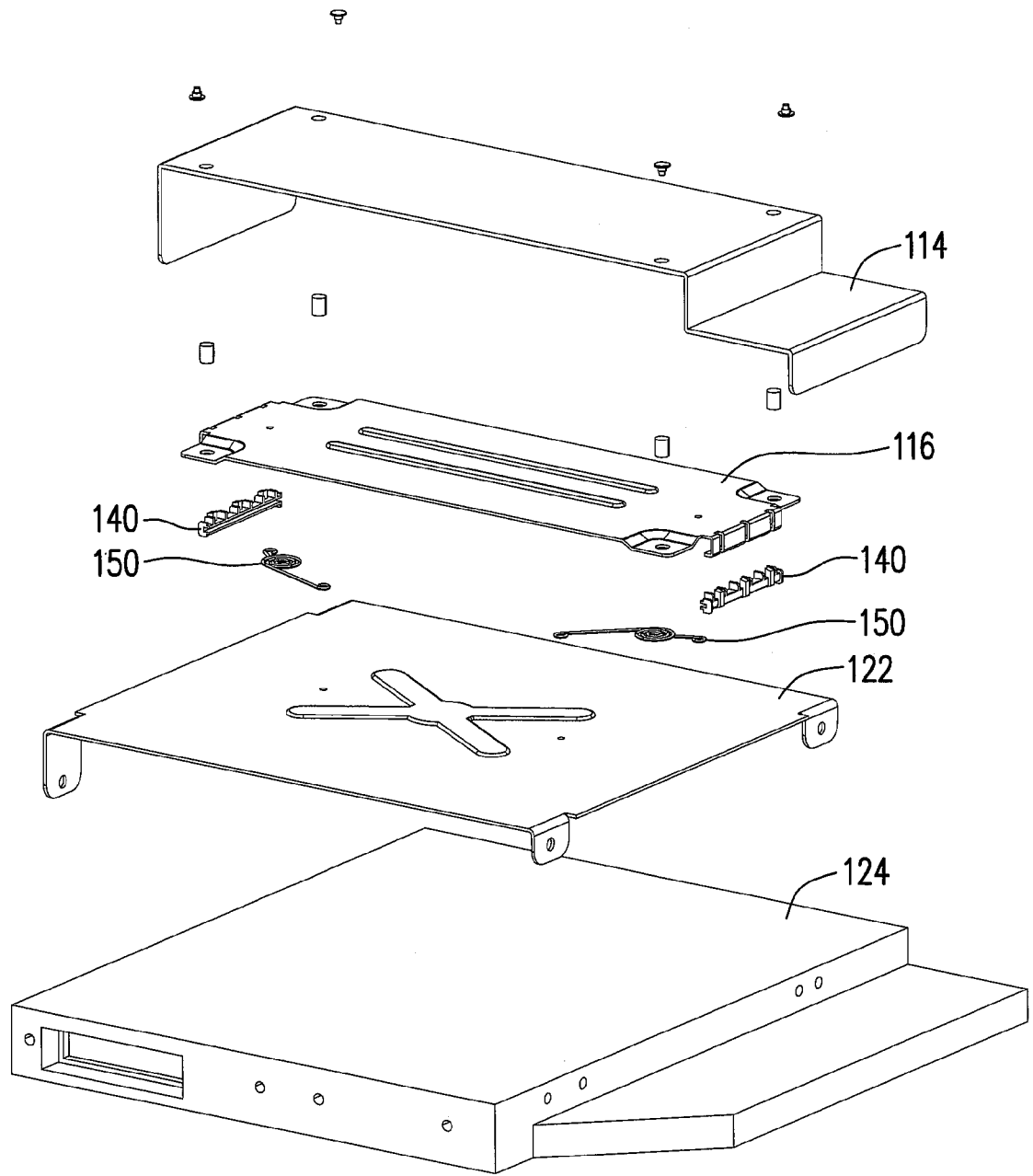
FIG. 5 is an exploded view of part of the electronic device in FIG. 2.

FIG. 5 is an exploded view of part of the electronic device in FIG. 2. Please refer to FIG. 5, screws and standoffs are used for fixing the fixed plate 116 in the frame 114. The electronic device 100 further includes at least one sliding element 140 fixed at the fixed plate 116 and slidably disposed at the sliding plate 122. The sliding plate 122 slides in the casing 112 by means of the sliding element 140. The number of sliding elements 140 is not limited hereby in present invention. Two sliding elements 140 are used as an example in this embodiment. As shown in FIG. 5, the two sliding elements 140 are respectively disposed at the two ends of the fixed plate 116. In this embodiment, the material of the sliding element 140 is plastic in order to improve the smoothness of the sliding action, and any other appropriate material can be used for the sliding element 140. The force that is used to pull the carriage 130 out of the storage device 120 is smaller than the force that is used to pull the storage device 120 out of the host 110. Therefore, the carriage 130 can be pulled to slide to the end of the position at first and then the storage device 120 just can be slid in the host 110. When a user wants to take out the compact disc (CD) from the optical disc drive (ODD) by using multi-phase mechanism of the present invention, he/she needs to pull the carriage 130 sliding to the end of the position in the first phase and then the storage device 120 just can be slid in the host 110 in the second phase when he/she continually pulls the carriage 130. When the carriage 130 is pulled out of the storage device 120 and the storage device 120 or a partial of the storage device 120 is pulled out of the host 110, he/she can take out the compact disc from the optical disc drive more easily. When the electronic device comprises the multi-phase mechanism of the present invention, a user can take the content out of the storage device more easily and smoothly, wherein the content is compact disc.

Figure 6A:
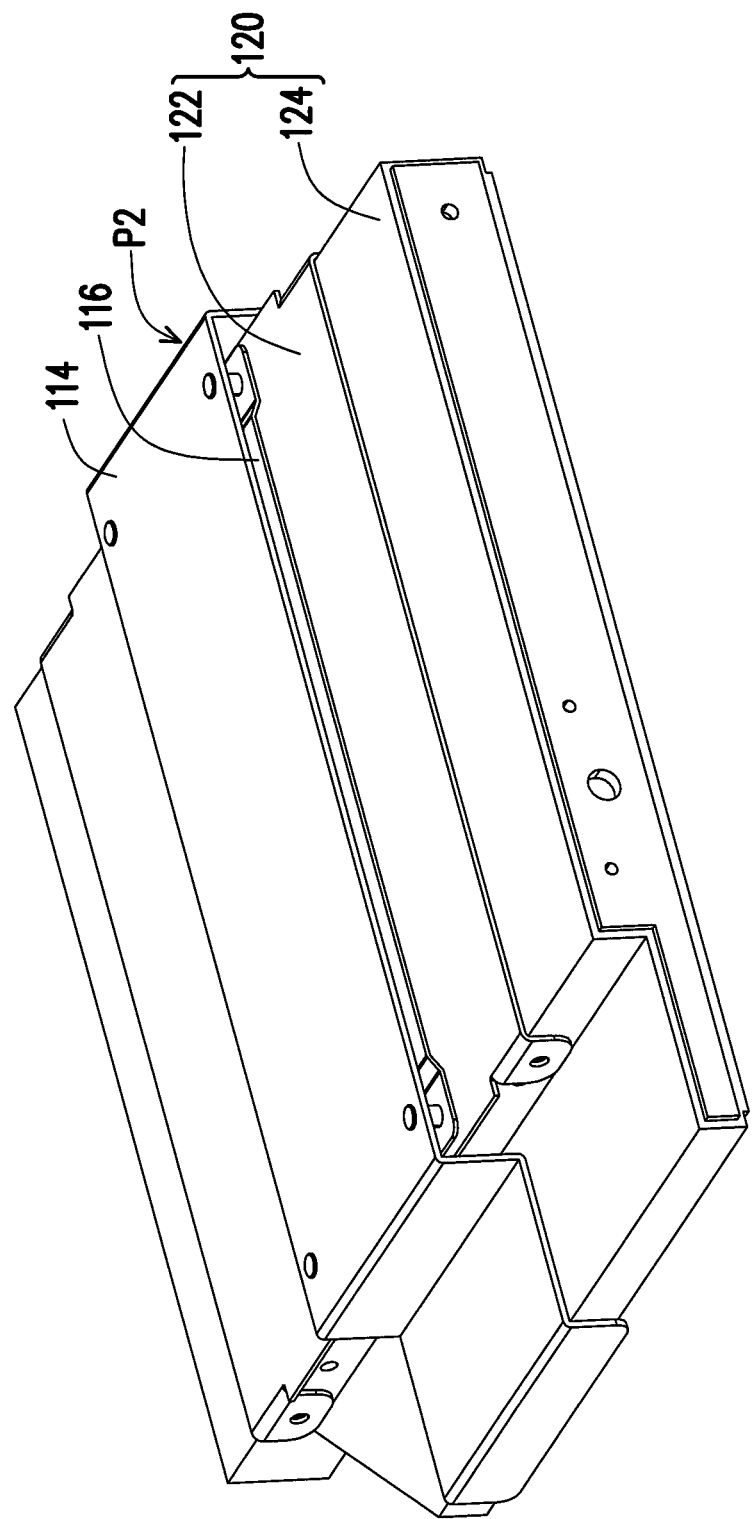
FIGS. 6A and 6B illustrate the movements between the storage device and the fixed plate in FIG. 4.
Figure 6B:
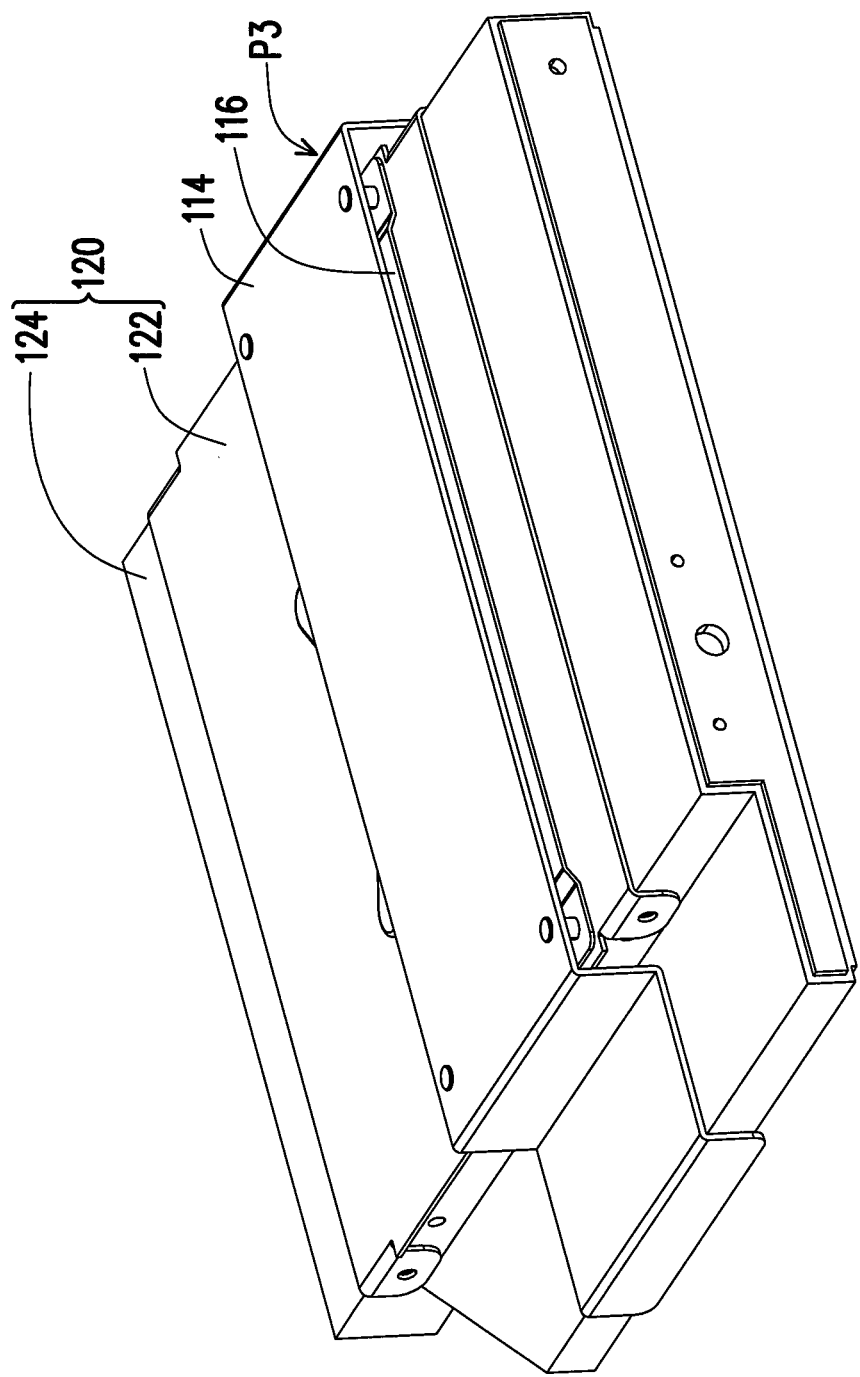

FIGS. 6A and 6B illustrate the movements between the storage device and the fixed plate in FIG. 4. Referring to FIG. 2, FIG. 4, FIG. 5, FIGS. 6A and 6B, the electronic device 100 further includes at least one elastic element 150. The elastic element 150 is fixed at the fixed plate 116 and connected between the fixed plate 116 and the sliding plate 122. The number of the elastic elements 150 is not limited hereby in present invention. Two elastic elements 150 are used as an example in this embodiment. As shown in FIG. 5, the two elastic elements 150 are respectively disposed at the two ends of the fixed plate 116. The storage device 120 can be pulled out and retracted from the host 110 through the disposing of the elastic element 150. In this embodiment, the elastic element 150 is a torsional spring.

In FIG. 4, the storage device 120 is in a first position P1 which is the storage position. In FIG. 6A, the storage device 120 is in a second position P2 which is the midway position during the pulling process. In FIG. 6B, the storage device 120 is in a third position P3 which is in a fully retracted position. Particularly, by properly disposing the elastic element 150, the following effect is achieved. Resisting the elastic force of the elastic element 150 is required to pull out the storage device 120 from the first position P1 to the second position P2, such that the storage device 120 is prevented from unexpectedly sliding out from the host 110. In addition, the storage device 120 is able to move from the second position P2 to the third position P3 by means of elastic force of the elastic element 150. In this way, disposing of the elastic element 150 further has the advantage that it is laboursaving while the storage device 120 is pulled out from the host 110. The actions described above in FIG. 4, FIGS. 6A and 6B are performed in reverse orientation to have the storage device 120 retracted back into the host 110. In other words, the user can resist elastic force of the elastic element 150 to retract the storage device 120 from the third position P3 to the second position P2. Then similarly, the storage device 120 moves from the second position P2 to the first position P1 by means of elastic force of the elastic element 150.

In summary, according to the embodiments of the present invention, through the storage device slidably disposing in the host and being adapted to be pulled out or retracted from the host, it facilitates the user to take or replace a compact disc from an optical disc notwithstanding the all-in-one computer is configured with a larger display. And thus, the encountering problem that the larger display units become the obstructions when taking out the compact disc from the optical disc drive in all-in-one personal computers can be solved by the improved structure of ODD provided in the present invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electronic device with multi-phase mechanism, comprising:
    a host;
    a storage device, slidably disposed in the host and adapted to be pulled out from the host; and
    a carriage, disposed in the storage device and adapted to be moved out from the storage device,
    wherein when the carriage is moved out from the storage device in a first phase and then the storage device is pulled out from the host in a second phase, a content in the storage device is taken out.

2. The electronic device according to claim 1, wherein the storage device comprises:
    a sliding plate, slidably disposed in the host; and
    a main body, fixed on the sliding plate, wherein the carriage is slidably disposed in the main body.

3. The electronic device according to claim 1, wherein the storage device is slidably disposed in the host along a sliding direction, and the carriage is slidably disposed in the storage device along the sliding direction.

4. The electronic device according to claim 1, wherein the host comprises:
    a casing;
    a frame, fixed in the casing; and
    a fixed plate, fixed on the frame, wherein the storage device is slidably disposed on the fixed plate.

5. The electronic device according to claim 4, further comprising at least one sliding element fixed at the fixed plate and slidably disposed at the sliding plate, in which the sliding plate slides by means of the sliding element.

6. The electronic device according to claim 4 further comprising at least one elastic element fixed at the fixed plate, wherein the sliding plate resists elastic force of the elastic element to move from a first position to a second position and the sliding plate moves from the second position to a third position by means of elastic force of the elastic element.

7. The electronic device according to claim 1, wherein the storage device is an optical disc drive.

8. The electronic device according to claim 1, further comprising a display fixed on the host, wherein the content is a compact disc, and the electronic device is an all-in-one computer.

9. The electronic device according to claim 1, wherein when the carriage is pulled from the storage device to an end position, the storage device is adapted to be slid in the host.

10. The electronic device according to claim 1, wherein a force that is used to pull the carriage out of the storage device is smaller than a force that is used to pull the storage device out of the host.

11. The electronic device according to claim 1, wherein the carriage is adapted to be rotated or slid relative to the storage device to move out from the storage device.

* * * * *